United States Patent
Pekor

[15] 3,692,457
[45] Sept. 19, 1972

[54] APPARATUS FOR CENTRIFUGALLY FORMING HOLLOW ARTICLES

[72] Inventor: Charles B. Pekor, Columbus, Ga.
[73] Assignee: Pekor Iron Works, Columbus, Ga.
[22] Filed: Feb. 10, 1971
[21] Appl. No.: 114,163

Related U.S. Application Data

[62] Division of Ser. No. 2,778, Jan. 14, 1970, Pat. No. 3,584,105

[52] U.S. Cl. ............................... 425/435, 264/236
[51] Int. Cl. ........ B22d 13/04, B29c 5/04, B29c 25/00
[58] Field of Search ...... 18/26 RR, DIG. 60; 25/30 C; 264/236, DIG. 78; 425/425, 435

[56] References Cited

UNITED STATES PATENTS

| | | | |
|---|---|---|---|
| 2,369,520 | 2/1945 | Barnes | 18/26 RR X |
| 3,587,137 | 6/1971 | Baldridge | 18/26 RR |
| 3,454,988 | 7/1969 | Cremer | 18/26 RR |
| 3,117,346 | 1/1964 | Bertin et al. | 18/26 RR |

*Primary Examiner*—Robert L. Spicer, Jr.
*Attorney*—Arnold, White & Durkee

[57] ABSTRACT

Apparatus for making hollow cylindrical articles includes a mold which is longitudinally split into two mold halves and can be opened to receive a quantity of hardenable liquid material. The open ends of the mold are sealed and a pressure differential is produced between the exterior and interior of the mold to induce compressive forces which urge the longitudinal edges of the split mold halves together. The mold is rotated at a speed which is sufficient to centrifugally distribute the liquid material uniformly in the mold. The compressive forces produced by the pressure differential counteract the centrifugal forces generated during rotation to seal the longitudinal edges of the mold halves together. The mold may be heated or cooled, depending on the material used, to harden the material after it is uniformly distributed along the mold interior.

10 Claims, 6 Drawing Figures

Charles B. Pekor
INVENTOR

BY

Arnold, White & Durkee
ATTORNEYS

APPARATUS FOR CENTRIFUGALLY FORMING HOLLOW ARTICLES

RELATED U. S. APPLICATION

This is a division of application Ser. No. 2,778, filed Jan. 14, 1970, now issued as U.S. Pat. No. 3,584,105 entitled "Method of Centrifugally Forming Hollow Articles."

BACKGROUND OF THE INVENTION

This invention relates to apparatus for centrifugally forming hollow cylindrical articles and particularly, for centrifugally forming pipe using longitudinally split molds.

Heretofore, most centrifugal forming of hollow articles has been done utilizing a solid cylindrical mold. In using solid molds, a charge of liquid material is introduced into the mold and the mold is rotated to centrifugally distribute the material around the inner surface of the mold to form the article. After this, the article is pulled or pushed longitudinally from one end of the solid mold. Ordinarily, the article adheres very tightly to the mold and is quite difficult to remove. Frequently, removal causes overstressing and damaging of the partially cured article. Often, a differential cooling of the article and mold has been necessary to provide differential shrinkage permitting the article to be removed from the mold. This has been both a costly and a time consuming operation.

Molds which are split longitudinally into two halves obviate the problem of removing the article from the mold after it is formed. However, it is exceedingly difficult to maintain the seal between the edges of the split mold halves during rotation since centrifugal force tends to pull them apart. Moreover, the greater the speed of rotation, the greater the forces which tend to pull the mold apart thereby permitting the liquid material to leak out of the mold. Split molds which have previously been used in centrifugal forming or casting generally have flanges located 180° apart which are fastened intermittently with bolts and nuts to maintain the abutting edges of the split molds together during rotation. A bolted flange split mold is shown in U.S. Pat. No. 2,369,520 issued on Feb. 13, 1945 to C. E. Barnes and entitled "Method of Polymerizing unsaturated Methylene Compounds." This patent also discloses the evacuation of air from the interior of the bolted mold for the purpose of eliminating oxygen which inhibits polymerization of the materials used. Other fastening devices, such as bands and complex locking arrangements, have also been used on split molds. Such fastening facilities add further mass to the mold causing increased forces which tend to open the mold. Furthermore, the mass of the opposed flanges and the fastening means create opposed forces which tend to pull the mold into an elliptical cross section during the rotation. Also, the flanges and fasteners prevent the rotating mold from being in dynamic balance. If an attempt is made to counter the mass of the flanges by locating equal masses at 90° and 270°, this mass tends to further increase the forces tending to separate the mold halves. Furthermore, any intermittent fastening arrangement, such as the flanges which are bolted together, allow some deflection in the mold between the bolted areas. This deflection between the bolted areas permits separation of the abutting edges of the mold halves, even though to a small degree, which allows the liquid material to be forced out of the mold during rotation. All of these problems become of practical consequence when the rotational speed is increased sufficiently to cause substantially uniform distribution of the polymer within the short gel time of the material.

Because of these problems utilizing split molds, it has been considered feasible to centrifugally manufacture plastic pipe or other hollow cylindrical articles using split molds at high rotational speeds.

SUMMARY OF THE INVENTION

The subject apparatus for centrifugally forming hollow articles includes a longitudinally split mold and facilities for vacuum sealing the split mold prior to the rotation thereof. By pulling a vacuum on the split mold, the mold halves have a compressive hoop stress induced therein. This compressive hoop stress tends to hold the mold halves together during rotation and counteract the centrifugal forces generated by the rotation. In centrifugally forming a hollow article, a predetermined quantity of liquid material, such as polyurethane, and a hardener, is applied to the interior of the opened split mold. The mold is then closed, and a vacuum is drawn on the interior to create compressive hoop stresses which urge the abutting edges of the mold halves together. The split mold is then rotated to uniformly distribute the material along the inner surface of the mold to form a hollow cylindrical article. The mold may be placed within a heated environment to facilitate the hardening or gelling of the material, if a thermosetting material such as polyurethane is used. The mold is rotated for a sufficient period of time until the material hardens, after which the split mold is opened and the hollow article easily removed therefrom.

The subject apparatus includes a split mold having machined recesses in the longitudinal edges which overlap. A gasket is placed between each of the adjacent edges. The mold is designed to apply a predetermined compression to the gasket when the edges abut. Each end of each portion of the split mold has projecting end flanges. The flanges fit into face plates which serve to both hold the mold halves together and to rotate the mold halves through driving facilities which are connected to one of the face plates. If desired, or necessary, depending on the material used, the rotatable mold may be mounted within an enclosure into which heated air is introduced to maintain a uniformly heated environment. The mold flanges at the ends of each of the mold halves have space for receiving flange inserts of different varieties wherein the hollow article can have certain types of flanges formed on the ends thereof simultaneously with the formation of the article. Vacuum facilities are connected to one end of the mold to permit the evacuation of air therefrom. By drawing a vacuum on the mold, the mold edges are urged together by atmospheric pressure which induces compressive hoop stresses in the molds. The smoothly machined edges bear against each other along the entire length of the mold thereby eliminating any intermittent areas which may tend to open up upon rotation of the mold.

DESCRIPTION OF THE INVENTION

Figure 1:
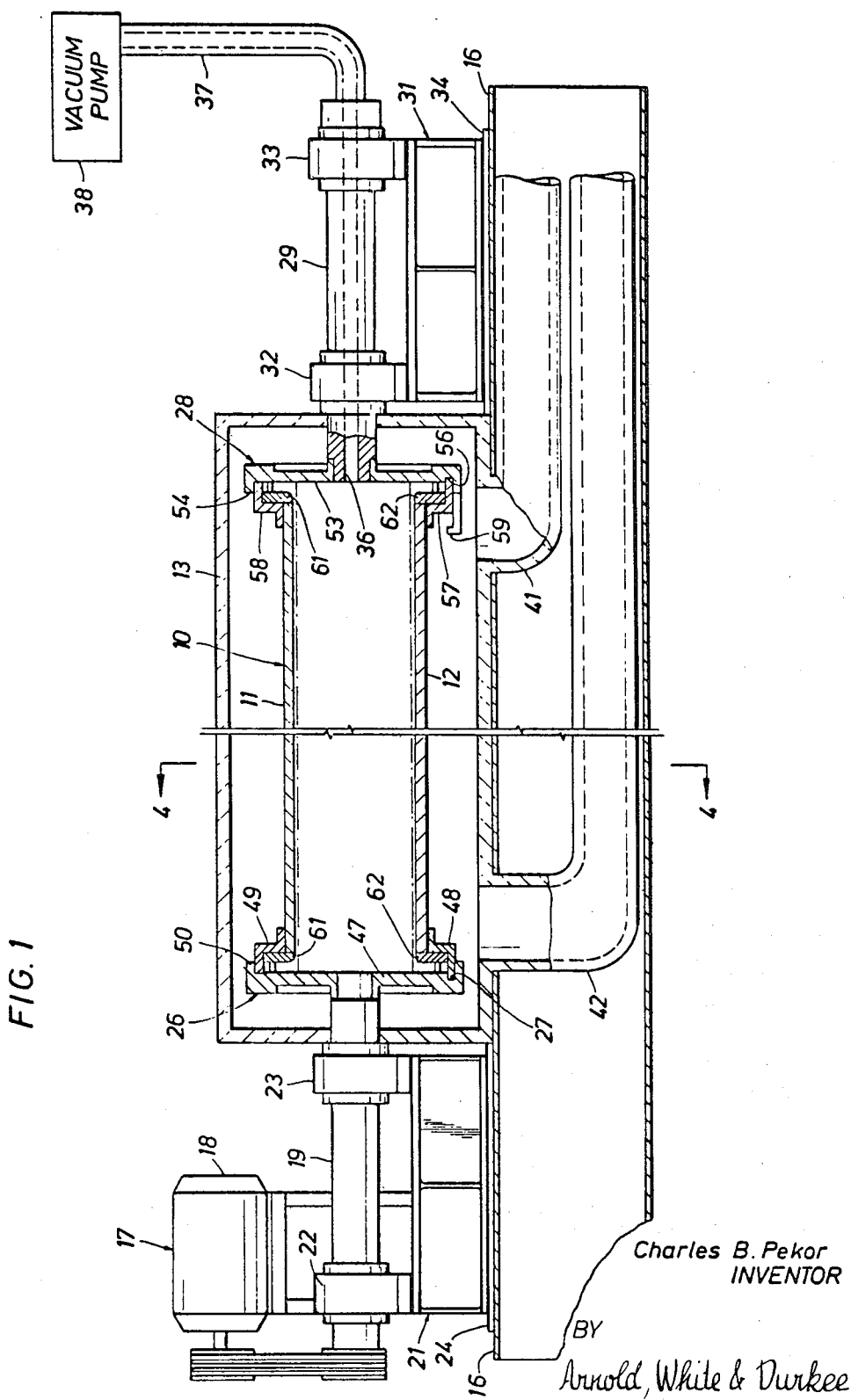
FIG. 1 is a partially cross-sectioned side view of the apparatus for centrifugally forming cylindrical articles in accordance with the principles of this invention.
Figure 6:
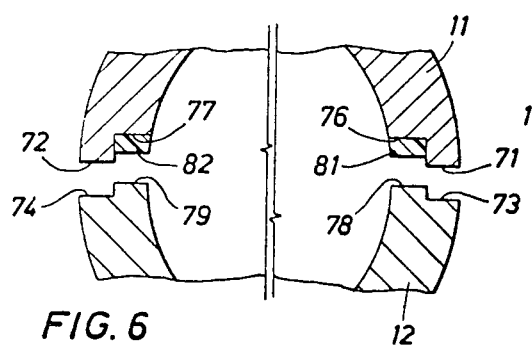
FIG. 6 is a separated cross-sectional view of the split mold showing the overlapping edges and the gasket seal.
Figure 4:
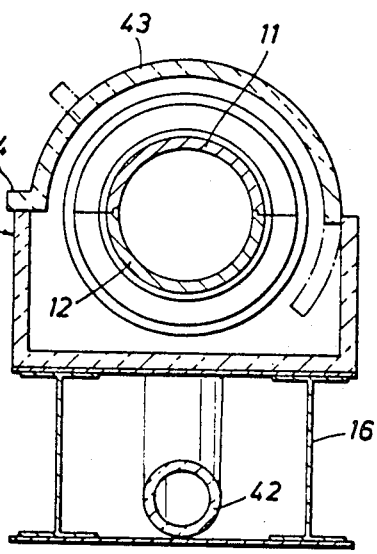
FIG. 4 is a cross-sectional view of the apparatus taken along line 4—4 from FIG. 1.

Referring to FIG. 1, there is shown apparatus for centrifugally forming cylindrical hollow articles, such as pipe, including a cylindrical split mold generally designated as 10 which consists of mold halves 11 and 12 as shown in FIGS. 4 and 6. The split mold 10 is mounted for rotation within an enclosure 13 which can be opened to provide access to the mold 10. The apparatus is built on a base 16 which is sufficiently stiff and heavy to dampen vibration and to maintain good alignment. The base 16 may be constructed similar to a lathe bed. Driving facilities, generally designated as 17, are mounted on the bed 16 and include a motor 18 which through a series of pulleys and belts drives a shaft 19. The drive shaft 19 mounted in a bearing stand 21 having a plurality of bearings 22 and 23 therein. The bearing stand 21 is substantially stationary, but is mounted to a machined guide surface 24 which permits accurate initial alignment of the shaft 19 with respect to the center of the mold 10.

Figure 2:
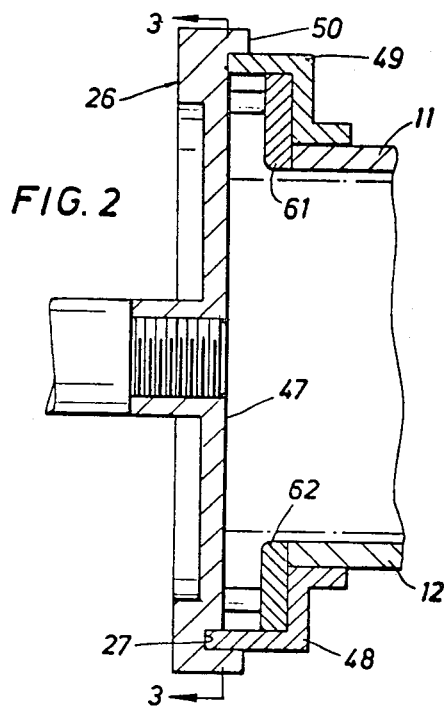
FIG. 2 is an enlarged cross-sectional view of one end of the split mold showing the mold flanges, the mold inserts and the connection with the rotating face plate.
Figure 3:
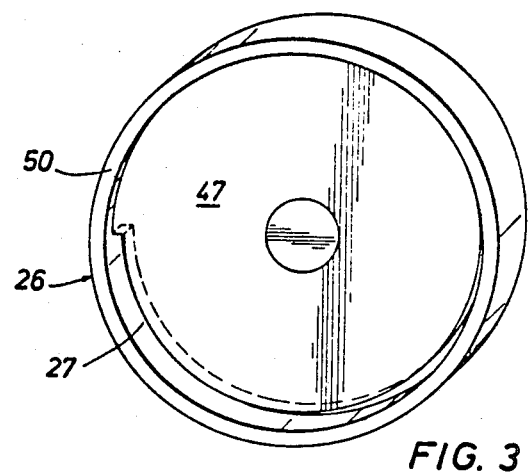
FIG. 3 is a cross-sectional view of the rotating face plate taken along line 3—3 from FIG. 2. 2.

One end of the shaft 19 is fixed to face plate 26, also shown in FIGS. 2 and 3. The face plate 26 has a recessed groove 27 formed in a portion of the inner surface thereof. The face plate 26 supports and holds one end of the mold halves 11 and 12 during the rotation. A similar face plate 28 is rotatably mounted to support and hold the other end of the mold halves 11 and 12.

The face plate 28 is fixed to a shaft 29 which is mounted for rotation in an axially movable bearing stand 31 having bearings 32 and 33 therein. The bearing stand 31 is mounted for limited axial movement on guide surface 34 which is mounted on the base 16 of the apparatus. The shaft 29 has a passageway 36 formed therein which communicates with the interior of the mold 10. The passageway 36 leads to a hose or conduit 37 which is connected to a vacuum pump or vacuum pumping facilities generally designated as 38, which are used to evacuate the interior of the mold 10. The enclosure 13, which is insulated, permits hot air to be introduced through an inlet duct 41 to the heat the interior of the chamber. An outlet or return duct 42 is provided so that there is a continuous circulation of hot air within the enclosure to uniformly heat the mold 10 and the material placed within the mold. The upper part of the enclosure 13 includes a movable hood 43 shown in FIG. 4, which is advantageously formed as a sector of a cylinder, and is mounted for rotation on the driveshaft 19 and tailstock shaft 29. The hood 43 can be opened by pushing the handle or projection 44 rearwardly as shown by the dotted lines in FIG. 4. The hood 43, of course, could be mounted some other way, such as by fixing a hinge to the back of the enclosure 13.

Referring to FIGS. 2 and 3, the face plate 26 is shown having a groove or recess 27 formed in a portion of the interior face 47. The recess is formed in only a portion of the circumference, such as for example 180°, to receive a flange 48 which is secured to the left end of the mold half 12, as shown in FIG. 1. The mold half 11 has another flange 49 fixed thereto which is shorter than the flange 48 so that it abuts against the interior face 47 of the face plate 26 when flange 48 is fully received within groove 27. An annular lip 50 is formed on the face plate 26 projecting outwardly from the interior face 47 and has an inside diameter substantially equal to the outside diameter of the mold flanges 48 and 49. The recess 27 provides for the alignment of the mold halves 11 and 12 with the driveshaft and also provides a means of transmitting driving torque from the face plate 26 to the mold 10. While the driving recess 27 is shown as being 180°, it may of course be less if desired. However, it is advantageous to have only the bottom mold 12 have the extending flange 48 in order to permit the upper mold half 11 to be removed from the lower mold half 12 while the lower mold half 12 is supported by the face plates 26 and 28, as is described more fully hereinafter.

The face plate 28 has an interior face 53 and a projecting annular lip 54. A groove 56 is formed in the face plate 28 similar to groove 27 in face plate 26. The groove 56 receives a flange 57 which is fixed to the right end of mold half 12. Another mold flange 58 is fixed to the mold half 11 and is shorter than flange 57 so that it abuts against the inner face 53 of face plate 28 when the lower flange 57 is fully received within the recess 56. An extending member or finger 59 is fixed to the projecting annular lip 54 near the midpoint of the recess 56. The finger 59 has an upstanding portion which engages the flange 57 of mold half 12 when the face plate 28 is moved a predetermined distance to the right.

To open mold 10 in order to remove a finished article and to place a charge of liquid material therein, the hood 43 is opened and the bearing stand 31 is moved axially to the right. As the bearing stand 31 is moved, the lip 54 of the face plate 28 first clears the edge of the upper flange 58 on mold half 11. At this point, the upstanding portion of finger 59 engages the flange 57 of the mold half 12 to pull the entire mold 10 so that the flange 49 clears the lip 50 of the face plate 26. The upper mold half 11 is thereby released from the face plates and can be lifted out of the enclosure 13 while the finished product and the lower mold half 12 remain supported by the flange 48 resting on lip 50 of face plate 26 and the flange 57 resting on lip 54 of face plate 28. Stops, not shown, can be placed to prevent the movable bearing stand 31 from moving far enough to allow the mold half 12 to drop. Of course, such stops could intentionally be moved to permit replacement of the entire mold when desired.

Figure 5:
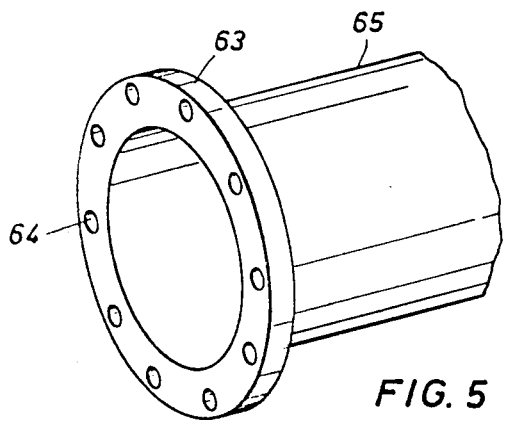
FIG. 5 is a partial perspective view of the flanged end of a pipe formed by the subject method and apparatus.

A pair of flange inserts, such as 61 and 62, can be positioned adjacent to the ends of the mold 10 to provide any desired end flange configuration on the pipe to be formed. As shown in FIG. 5, a standard flange 63 having holes 64 formed therein around the circumference was formed simultaneously with the pipe 65 by using flange inserts 61 and 62. The flange inserts 61 and 62 may be semicircular in shape to correspond to the shape of each mold half and thereby facilitate the disassembly thereof from the finished product.

The mold halves 11 and 12 have machined interlocking longitudinal edge surfaces which overlap one another as shown in FIG. 6. Mold half 11 has outer longitudinal edge surfaces 71 and 72, which abut against recessed outer longitudinal edge surfaces 73 and 74 in mold half 12. Recessed inner longitudinal edge surfaces 76 and 77 in mold half 11 cooperate with inner longitudinal edge surfaces 78 and 79 in mold half 12. When the outer edge surfaces 71 and 73, and 72 and 74 are in contact, a clearance is provided between surfaces 76 and 78, and 77 and 79 for gaskets 81 and 82, respectively. Gaskets 81 and 82 are thicker than the clearance provided so that when the mold halves 11 and 12 are properly assembled with the gaskets 81 and 82 between the inner edge surfaces, there is a predetermined compression in the gaskets which provides an effective seal preventing liquid material from passing between the edges of the mold halves. Additionally, when the outer longitudinal edges 71 and 73, and 72 and 74 are in contact, the mold halves are aligned and the interior of the mold is cylindrical notwithstanding minor variations in the thickness of the gaskets 81 and 82. Thus each time the mold halves 11 and 12 are placed together, the interior forms a substantially perfect cylinder that insures proper shape and diameter of the finished article.

For purposes of this description, the hollow article is referred to as a pipe and is made of a thermosetting type material, such as polyurethane. Other polymers may, of course, be used to make articles in accordance with the principles of this invention. Moreover, this invention is applicable to making articles out of any kind of material which is capable of being formed centrifugally.

In the operation of the apparatus, the hood 43 is opened and the upper mold half 11 is removed. Predetermined amounts of heated polyurethane and hardener in a liquid state are then mixed. This mixture has a relatively short pot life and consequently is not usually prepared until it is time to charge the mold. The mixture is then quickly poured into and distributed longitudinally along the mold half 12. The longitudinal distribution of the material is easily accomplished by being able to pour it into the opened split mold as opposed to charging it through one end of a solid mold. Additionally, the split mold can be charged more quickly, thereby saving time and decreasing the possibility of the material hardening before it is uniformly distributed by the rotation of the mold. The mold 12 is within the heated enclosure 13 and is hot when the material is poured into it. It is desirable that the temperature of the mold be at least as high as the temperature of the polyurethane material to prevent chilling.

As soon as the material has been distributed into the mold half 12, the upper mold half is lowered into place, and the movable bearing stand 31 moved inwardly so that the projecting mold flanges 48 and 57 enter the recesses 27 and 56 in the face plates 26 and 28, respectively. The mold halves 11 and 12 are now locked together and connected in driving relationship to the motor 17. As soon as the hood 43 is closed hot air again begins circulating inside the enclosure 13. Then, the vacuum pump 38 is started and air is evacuated from the interior of the mold 10 through passageway 36 until there is a predetermined pressure differential between the exterior and the interior of the mold. The forces created by atmospheric pressure acting radially inward on the mold 10 sufficiently pre-stresses the mold halves by urging them together so that they can resist and counteract the centrifugal forces tending to separate the mold halves during rotation. If a greater differential pressure is required than can be obtained by an internal vacuum, the enclosure 13 can be modified so that it can be pressurized to any desired pressure thereby creating greater forces acting to seal the mold halves together.

The mold 10 is then rotated at a speed which is sufficient to uniformly distribute the material in the mold by centrifugal force, but does not exceed the speed that will cause the centrifugal forces generated by the rotation of the mold to exceed the vacuum induced forces acting to hold the mold halves together. The motor facilities 17 may be energized to rotate the mold at a low speed as soon as a partial vacuum is pulled on the mold. Then, when the predetermined pressure differential is reached, the speed may be increased to the desired speed. The mold is rotated for a period of time sufficient to uniformly distribute the material within the mold to form the desired pipe and to partially cure the material. The rotation of the mold facilitates removal of any gas bubbles present in the material. As the liquid material is being distributed within the mold, gas bubbles in the material are displaced toward the center of the mold by the movement of the liquid material by centrifugal force toward the mold periphery The gas bubbles thus move toward the inner surface of the pipe and the gas is liberated at the interface of the material. Additionally, to eliminate gas bubbles in the material, the polymer, e.g., the polyurethane, may be degassed prior to mixing with the hardener. The heated enclosure 13 provides uniform heat along the entire length of the mold. The polyurethane material may harden after about five to ten minutes of rotation. The rotation, however, is continued for another period of time, perhaps 15 to 20 minutes after initial hardening, to post-cure the pipe. The post-curing provides sufficient structural strength to permit removal of the product without damage or permanent deformation. It is well known that polyurethane upon initial gelling or hardening has little structural strength and must be cured after hardening for a period of time generally ranging from 30 minutes to 2 hours, and at an elevated temperature of approximately 212° F. to increase its structural strength to substantially its maximum. After the post-curing period, vacuum in the mold is quickly released and the mold is opened and the pipe removed. The pipe is then placed in a cradle or on a mandrel and inserted into an oven for the remainder of the time necessary to effectively cure the material and strengthen the pipe. The cradle or mandrel maintains the shape of the pipe during the curing. Of course, the pipe may be completely cured within the mold 10, but it is not economical or efficient to utilize the apparatus for such a long period of time in manufacturing one pipe. It can be appreciated that since the polyurethane pipe has such little structural strength when it is first removed from the mold, that attempting to remove such a pipe from a solid mold by pushing it or pulling it would very likely cause permanent damage to the pipe.

The forces tending to hold the mold halves 11 and 12 together act evenly along the entire length of the mold joints. Consequently, there are no intermittent unclamped areas which may tend to open. Furthermore, with mechanical type locks and fasteners all unbalanced forces create longitudinal stresses that vary with the square of the length. However, by using the vacuum seal, there are no flanges, lugs or bolts to create unbalanced forces. Thus the length of the mold is limited only by the static structural strength of the mold itself. Additionally, the vacuum inside the mold further assists the degassing or removing of the gaseous bubbles from the liquid polymer. Although the centrifugal forces help to free the polymer of bubbles, the vacuum degassing will facilitate the use of materials having such a short pot life that centrifugal degassing alone may be insufficient.

After the mold has rotated for sufficient time to post-cure the polyurethane pipe, the motor 17 is stopped and the hood 43 opened to permit access to the mold 10. The vacuum is released and the bearing stand 31 is moved to the right so that the face plate 28 moves away from the mold flanges 57 and 58. When the finger 59 engages the vertical portion of the flange 57, the flange 49 is pulled out of engagement with the face plate 26 leaving the upper mold half 11 free to be removed. The lower mold half 12 remains supported by the lip 50 engaging the flange 48 at the left hand end and by the lip 54 engaging the flange 57 at the right hand end. A crane can then be utilized to lift the upper mold half 11. The pipe can then be easily removed from the lower mold half 12 and the flange inserts 61 and 62 removed from the pipe flanges 63.

It is to be noted that the vacuum seal can be easily and quickly released in a matter of seconds while mechanical seals usually involve considerable time in separating the mold halves. Thus, the cycle time per article is greatly reduced, making the manufacture of pipe by centrifugal casting even more practical and efficient.

An alternative embodiment of the subject invention utilizes both heating and cooling facilities when making articles out of a thermoplastic type material. The mold may be charged with either liquid thermoplastic material or with solid pellets of thermoplastic material. If pellets are used, the pellets are heated in the mold until they liquify. The mold may be vacuum sealed at any time during the heating. If the thermoplastic is already in the liquid state, heat should be applied to maintain it liquid. Then, the mold is rotated to centrifugally distribute the liquid material evenly along the interior of the mold. Cooling facilities are connected to the ducts 41 and 42 to cool the mold and the enclosure 13 so that the thermoplastic material hardens after it is centrifugally distributed. After sufficient cooling, the mold may be opened and the thermoplastic article removed.

Another alternative embodiment of the subject invention provides for pressurization of the enclosure 13 so that an increased pressure differential between the exterior and interior of the mold can be obtained. For certain materials, such as ones having a high viscosity, the maximum rotational speed which can be utilized with the vacuum sealing alone, may be insufficient to cause proper distribution of the material within the mold. Accordingly, to increase the rotational speed of the mold requires an increased pressure differential which urges the mold halves together. This is obtained by providing suitable sealing facilities around the hood 43 to seal the enclosure 13. Pressurization facilities can then be connected to the enclosure 13 to provide a desired pressure on the mold exterior, which in conjunction with the vacuum drawn on the mold interior, is sufficient to keep the mold halves 11 and 12 sealed during the rotation of the mold at the speed necessary to obtain the even distribution of the highly viscous material within the mold.

It is to be understood that the above described embodiments are merely illustrative of applications of the principles of this invention and that numerous other arrangements and modifications may be made within the spirit and scope of the invention.

I claim:

1. Apparatus for centrifugally forming hollow cylindrical articles comprising:
    a cylindrical mold for receiving a predetermined quantity of hardenable liquid material, said mold being longitudinally split into a first and a second mold half;
    a pair of end closure means for sealing the open ends of said mold;
    means for rotating said mold at a speed sufficient to centrifugally distribute said liquid material uniformly along the inner surface of said mold for a period of time sufficient to harden said material into a hollow cylindrical article; and
    means for producing a differential pressure between the exterior and interior of said mold to induce differential pressure compressive forces between said mold halves counteracting the centrifugal forces generated by the rotation of said mold for sealing together the longitudinal edges of said mold halves.

2. Apparatus for centrifugally forming hollow cylindrical articles as set forth in claim 1 wherein said means for producing a differential pressure includes a vacuum pump for evacuating the interior of said mold.

3. Apparatus for centrifugally forming hollow cylindrical articles as set forth in claim 1 including an enclosure for said rotating mold and wherein said means for producing a differential pressure includes means for pressurizing said enclosure.

4. Apparatus for centrifugally forming hollow cylindrical articles as set forth in claim 1
    wherein said first mold half has first projecting flanges on each end thereof, and said second mold half has second projecting flanges on each end thereof;
    and wherein said end closure means are adapted to receive said first and second flanges and provide an annular space between each end closure and the adjacent end of the mold; and including
    means positioned in each annular space for receiving centrifugally distributed liquid material during rotation of said mold and forming a selected flange configuration integrally on each end of said hollow cylindrical article.

5. Apparatus for centrifugally forming hollow cylindrical articles as set forth in claim 1 wherein at least one of said end closure means is longitudinally movable relative to said mold and wherein said pair of closure means are adapted to support one of said mold halves and release the other of said mold halves upon said movable closure means moving a predetermined distance.

6. Apparatus for centrifugally forming hollow cylindrical articles as set forth in claim 1 wherein said hardenable liquid material is a thermosetting material and including:

means for heating the mold to maintain the liquid material at a predetermined elevated temperature and to harden said material after it is centrifugally distributed along the inner surface of the mold.

7. Apparatus for centrifugally forming hollow cylindrical articles as set forth in claim 1 wherein said hardenable liquid material is a thermoplastic material and including:

means for heating the mold to maintain the thermoplastic material in a liquid state during the rotation of the mold; and means for cooling the mold after the material is centrifugally distributed to harden said thermoplastic material.

8. Apparatus for centrifugally forming hollow cylindrical articles as set forth in claim 1 wherein said mold halves each have longitudinal edge surfaces which interengage to accurately position one mold half with respect to the other to provide a cylindrical interior surface, and including:

gasket means positioned between the interengaging edge surfaces to prevent liquid material from being forced out of the mold during rotation thereof.

9. Apparatus for centrifugally forming hollow cylindrical articles as set forth in claim 1 wherein said first mold half has first projecting flanges on each end thereof, and said second mold half has second projecting flanges on each end thereof; said second projecting flanges being longer than said first projecting flanges; and each of said end closure means has an annular lip around the periphery thereof which engages in overlapping relationship the adjacent first and second mold flanges to hold said mold halves together, each end closure means having a recess formed therein to receive a portion of the longer second projecting flange, at least one of said end closure means being longitudinally movable relative to said mold so that upon movement of a predetermined distance said annular lips on said end closure means move out of engagement with said first projecting flanges on said first mold half and remain in engagement with the longer second projecting flanges on said second mold half thereby supporting said second mold half and permitting removal of said first mold half.

10. Apparatus for centrifugally forming hollow cylindrical articles comprising:

a cylindrical mold for receiving a predetermined quantity of hardenable liquid material, said mold being longitudinally split into first and a second mold halves, said first mold half having first projecting flanges on each end thereof, and said second mold half having second projecting flanges on each end thereof, said second projecting flanges being longer than said first projecting flanges;

a pair of end closure means for sealing the open ends of said mold, each of said end closure means having an annular lip around the periphery thereof which engages in overlapping relationship the adjacent first and second mold flanges to hold said mold halves together, each end closure means having a recess formed therein to receive a portion of the longer second projecting flange, at least one of said end closure means being longitudinally movable relative to said mold so that upon movement of a predetermined distance said annular lips on said end closure means move out of engagement with said first projecting flanges on said first mold half and remain in engagement with the longer second projecting flanges on said second mold half thereby supporting said second mold half and permitting removal of said first mold half;

means for rotating said mold at a speed sufficient to centrifugally distribute said liquid material uniformly along the inner surface of said mold for a period of time sufficient to harden said material into a hollow cylindrical article; and means for producing a differential pressure between the exterior and interior of said mold to induce differential pressure compressive forces between said mold halves counteracting the centrifugal forces generated by the rotation of said mold for sealing together the longitudinal edges of said mold halves.

* * * * *